United States Patent
Wang et al.

(10) Patent No.: US 11,259,206 B2
(45) Date of Patent: Feb. 22, 2022

(54) CONTROLLING QUALITY OF SERVICE CLASS IDENTIFIER WEIGHTS FOR IMPROVED PERFORMANCE IN 5G OR OTHER NEXT GENERATION NETWORKS

(71) Applicant: AT&T INTELLECTUAL PROPERTY I, L.P., Atlanta, GA (US)

(72) Inventors: Huahui Wang, Bridgewater, NJ (US); Ravi Raina, Skillman, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 74 days.

(21) Appl. No.: 16/889,092

(22) Filed: Jun. 1, 2020

(65) Prior Publication Data
US 2021/0377780 A1 Dec. 2, 2021

(51) Int. Cl.
*H04W 28/02* (2009.01)
*H04L 12/851* (2013.01)
*H04W 24/06* (2009.01)
*H04L 47/2425* (2022.01)

(52) U.S. Cl.
CPC ..... *H04W 28/0268* (2013.01); *H04L 47/2425* (2013.01); *H04W 24/06* (2013.01)

(58) Field of Classification Search
CPC ..... H04W 24/02; H04W 24/06; H04W 24/08; H04W 24/10; H04W 28/0268; H04W 36/30; H04W 72/042; H04L 47/24; H04L 47/2408; H04L 47/2416; H04L 47/2425; H04L 47/2433
See application file for complete search history.

(56) References Cited

U.S. PATENT DOCUMENTS

| 2007/0097868 | A1* | 5/2007 | Bizzarri | H04L 41/5048 370/241 |
| 2016/0112896 | A1* | 4/2016 | Karampatsis | H04W 28/0289 370/230.1 |
| 2018/0191620 | A1* | 7/2018 | Karthikeyan | H04L 47/24 |
| 2021/0014141 | A1* | 1/2021 | Patil | H04W 24/02 |

OTHER PUBLICATIONS

Wang, H. et al. | Network Improvement With Reinforcement Learning, U.S. Appl. No. 17/410,617, filed Aug. 24, 2021, 45 pages.

* cited by examiner

*Primary Examiner* — Peter Chen
(74) *Attorney, Agent, or Firm* — Amin, Turocy & Watson, LLP

(57) ABSTRACT

The disclosed technology describes on-demand adjusting of the quality of service (QoS) class identifier (QCI) relative weight settings for different QCI classes associated with user devices. A QoS controller, which can be implemented in a standalone or a cloud configuration, updates the QCI weight settings as requested or needed to deal with changing network environments, such as growing traffic, different RF conditions, new devices, ratio of different service classes of user devices, to improve the overall performance of one or more cell sites. In one implementation, the QoS controller collects actual network statistics, and runs simulations based on those statistics with different groups of candidate QCI weight settings to generate multiple result sets. The QoS controller evaluates the result sets to determine which group of QCI weight settings meets desired performance objectives, and then applies those QCI weight settings to one or more NodeBs for use with actual data traffic.

20 Claims, 13 Drawing Sheets

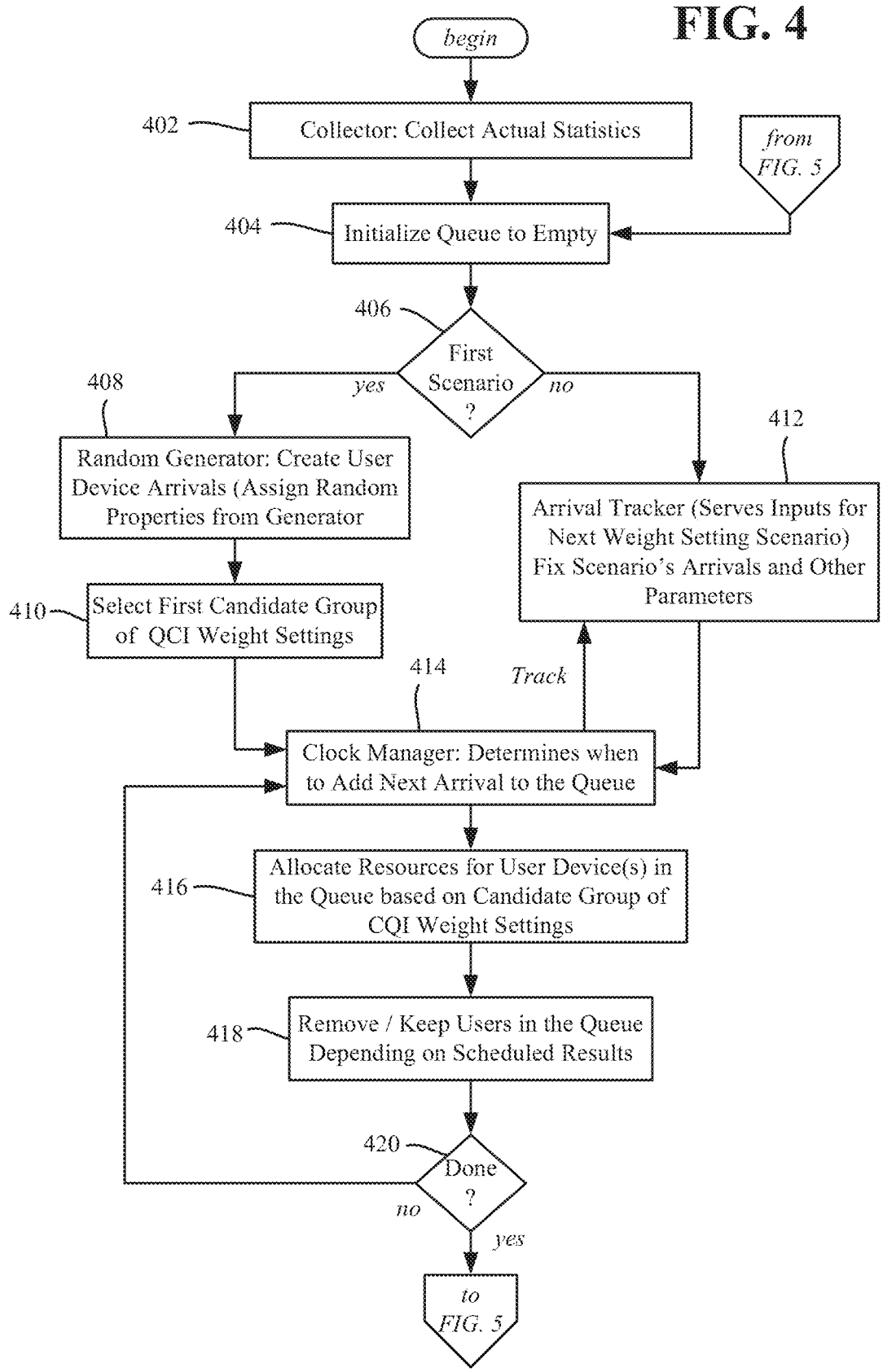

CONTROLLING QUALITY OF SERVICE CLASS IDENTIFIER WEIGHTS FOR IMPROVED PERFORMANCE IN 5G OR OTHER NEXT GENERATION NETWORKS

TECHNICAL FIELD

The subject application relates to wireless communications systems in general, and more particularly to systems, including New Radio (NR) fifth generation (5G) cellular wireless communications systems and/or other next generation networks, in which relative quality of service class identifier (QCI) weights used by one or more cell sites determine the overall performance and service class differentiation.

BACKGROUND

In wireless communications, service differentiation allows for different users to pay for different levels of service. For example, when a wireless system is experiencing high load, premium users and applications that require higher throughput and/or less delay are given more resources than lower-tier users and applications.

Service differentiation is generally implemented using different quality of service (QoS) class identifier (QCI) values representing different user/device classes that map to different relative QCI weights. Premium users with more priority are given a larger QCI relative weight such that their transmission opportunities are higher when competing for resources with lower priority classes having lower relative weights.

The relative priority weights of the QCI classes are predetermined for each cell site (NodeB), and generally are determined in a static way for a large region (e.g., an overall market or part of an overall market). To decide the values of the weights, generally a 'trial and error' approach is used, with acceptable QCI weights being adopted QCI. Once adopted, the weights are set statically for the NodeBs in one market.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIGS. 4 and 5 comprise a flow diagram showing example operations performed by a QoS controller including a simulator to simulate results sets based on collected data and different relative groups of QCI weight settings, in accordance with various aspects and embodiments of the subject disclosure.

DETAILED DESCRIPTION

Figure 1:
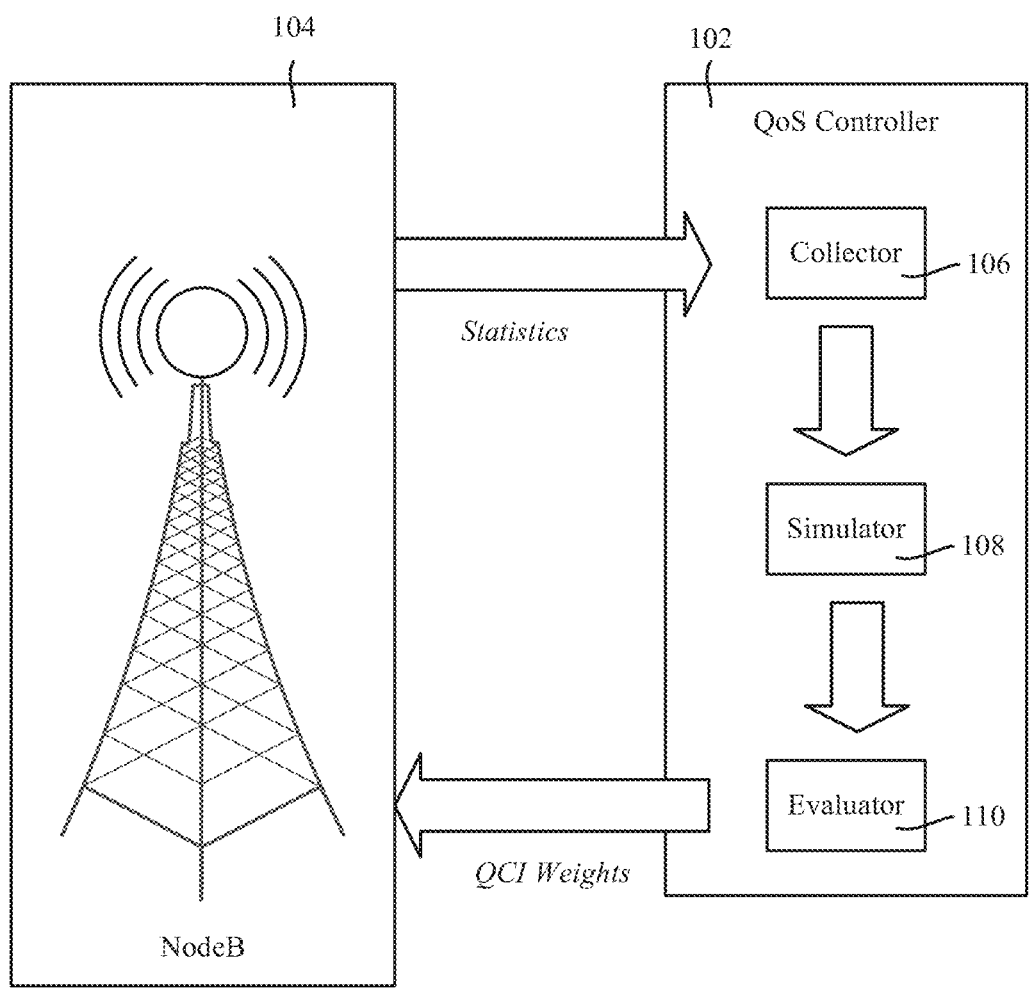
FIG. 1 illustrates an example quality of service (QoS) controller determining QoS class indicator (QCI weights) for use by a cell site (a NodeB) in providing different levels of service to different QCI classes of user devices based on collected statistics, in accordance with various aspects and embodiments of the subject disclosure.

The technology described herein is generally directed towards performing quality of service (QoS) control in wireless communication systems, including fourth generation long term evolutions (4G LTE), fifth generation new radio (5G NR) and beyond. The technology can be implemented via a QoS controller that intelligently manages priority changes for different service classes, in a relatively dynamic manner, to provide improved performance. Improved performance can correspond to a performance objective, such as measured by overall throughput, and/or to achieve a service differentiation objective.

In general, the QoS controller, which can be implemented in a standalone configuration or a cloud configuration, adjusts the relative QoS class identifier (QCI) weight settings for different QCI classes associated with user devices. The settings can be updated reasonably frequently, to deal with changing environments in a way that improves the overall performance of a cell site or multiple cell sites.

In one aspect, the QoS controller automates the adjustment of service differentiation by using intelligence from reported statistics. The QCI weight settings can thus be adjusted for changing conditions, such as growing traffic, different RF conditions, new devices, a changing ratio of different classes of users/user devices, and so forth. This is in contrast to current model that uses static, predetermined QCI weight settings, (which sometimes are simply default values from device vendors), and which is limited by its "one-size-fits-all" model.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

As shown in FIG. 1, a QoS controller 102 collects statistics from a cell site/node B 104, which can be any gNode, eNodeB or the like that is configured to have different classes of service corresponding to user devices with different QCI values. As shown in FIG. 1, the QoS controller can be an integrated module physically co-located with one of the NodeBs, e.g., the NodeB 104 in FIG. 1.

In the example of FIG. 1, the statistics are collected by a collector 106. After some suitable threshold is reached, e.g., over a period of time or when some desired amount of statistics are collected, a simulator 108 as described herein runs simulations that are based on the statistics. In general, the simulations are run with different groups of QCI weight settings changed per simulation session. For example, the statistics can be used as is, e.g., statistical data 1, for running with a first group of QCI weight settings, with the first results for statistical data 1 saved, then with a second group of QCI weight settings with the second results for statistical data 1 saved, and so on. For example, in the first group of weight settings, the weight ratios for QCI8 vs. QCI9 can be 2:1, in the second group of weight settings, the weight ratios for QCI8 versus QCI9 can be 4:1, then in a third group 8:1, and so on.

It should be noted that the examples described herein are directed towards different weight ratios for QCI8 versus QCI9, because most of the data traffic are in these classes; however, a group of weight settings applies weights to any QCI class value. Further note that the QCI8 versus QCI9 weight ratios have been traditionally been based on $2^N:1$, that is, 2:1, 4:1 8:1 and so on, however this is not a requirement, and the weight ratio can be any ratio that provides the desired performance results, e.g., 6:1, 5:2 and so on.

In another aspect, the statistics can be modified with random parameter changes, to form a varied set of statistics, e.g., statistical data 2. The varied set of statistics can be for running with a first group of QCI weight settings, with the first results for statistical data 2 saved, then with a second group of QCI weight settings with the second results for statistical data 2 saved, and so on.

Once the simulated results are known, an evaluator 110 processes the results as described herein, to determine/select a group of QCI weight settings that provide desired performance results. The desired performance results can be based on a desired overall throughput amount and/or desired level of service class differentiation. The QoS controller 102 then instructs the NodeB 104 to use the selected group of QCI weight settings.

It should be noted that the example of FIG. 1 shows the QoS controller 102 as containing the collector 106, simulator 108 and evaluator 110, as well as applying the updated QCI weights to the NodeB 104. However, it is understood that in other implementations, any or all of the example structure and/or functionalities in any of the drawings can be implemented as separate components, as components combined into a lesser number of components, and/or components further divided into additional sub-components.

Figure 2:
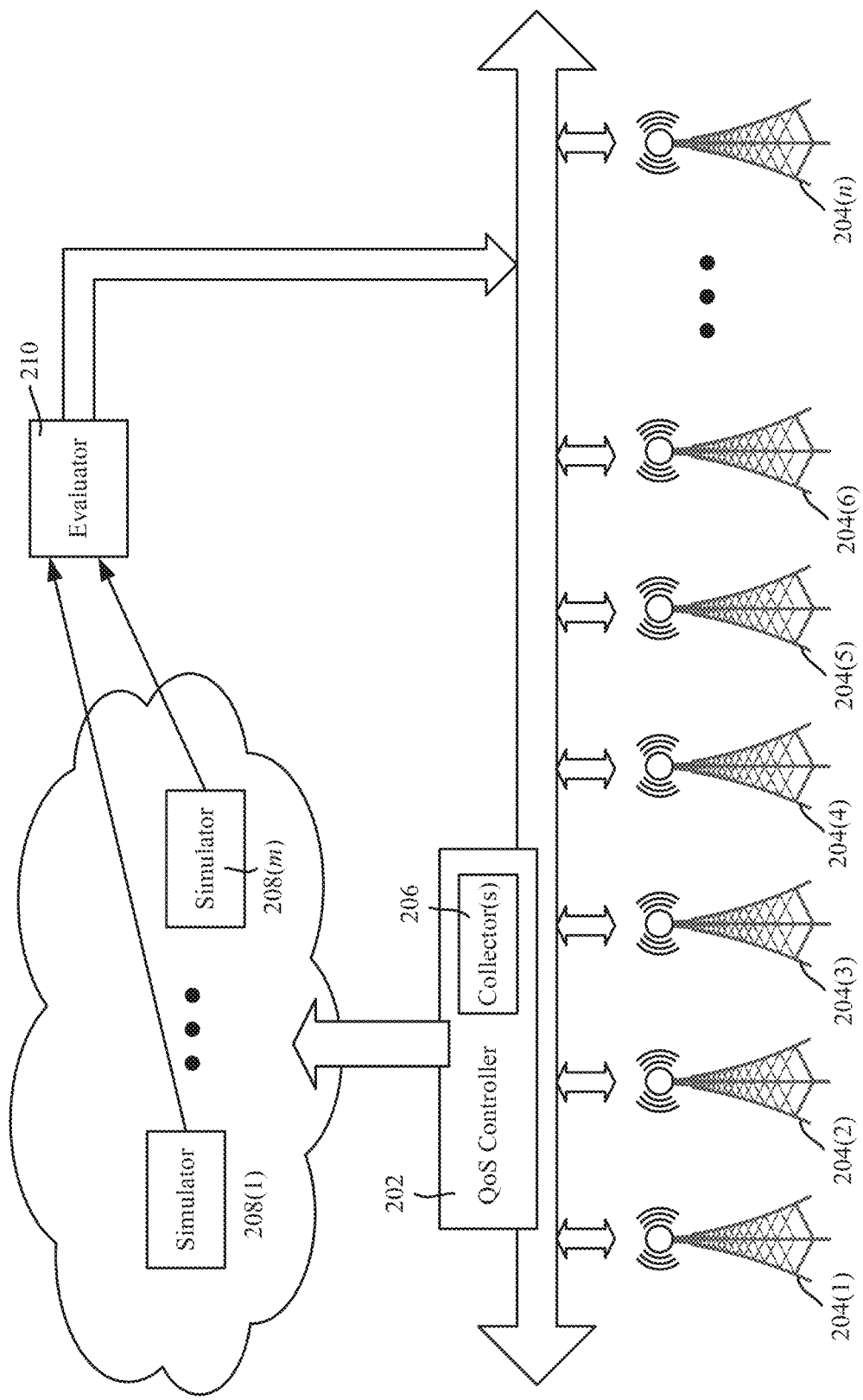
FIG. 2 illustrates an example QoS controller determining QCI weights for use by multiple NodeBs, in accordance with various aspects and embodiments of the subject disclosure.
Figure 3A:
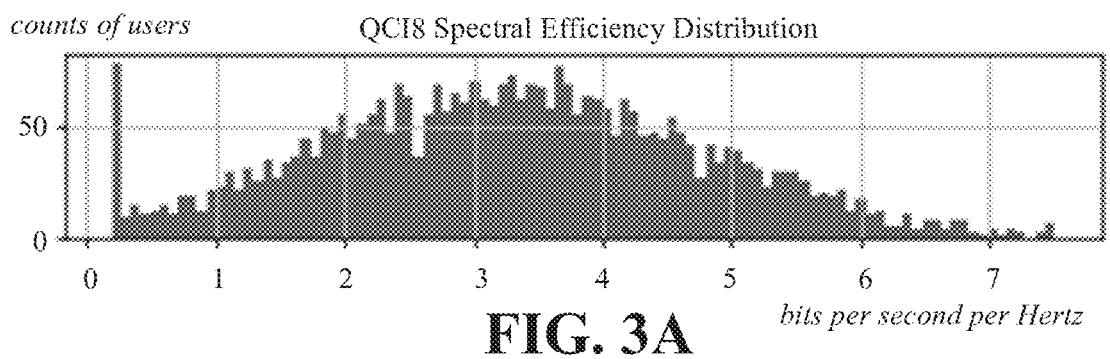
FIGS. 3A-3D are example representations of histograms for service classes corresponding to QCI8 and QCI9 values, in accordance with various aspects and embodiments of the subject disclosure.
Figure 3B:
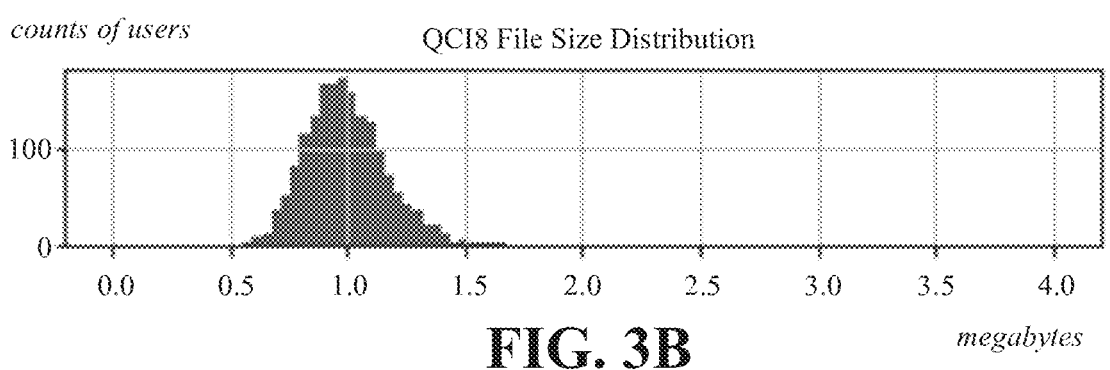
Figure 3C:
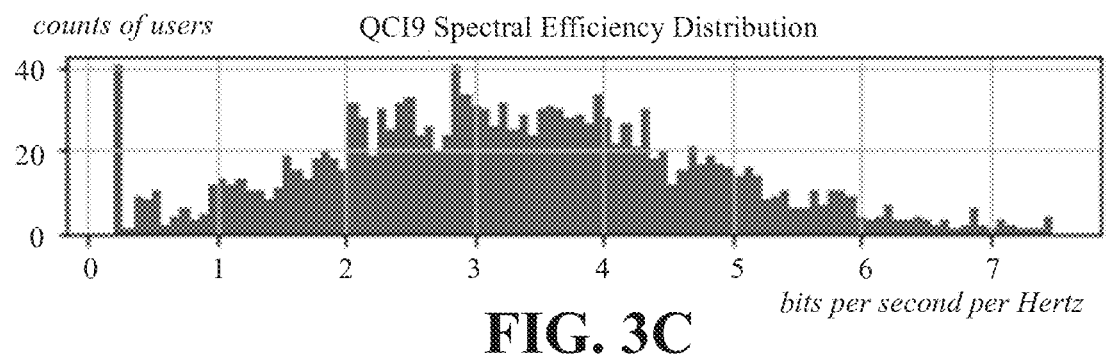
Figure 3D:
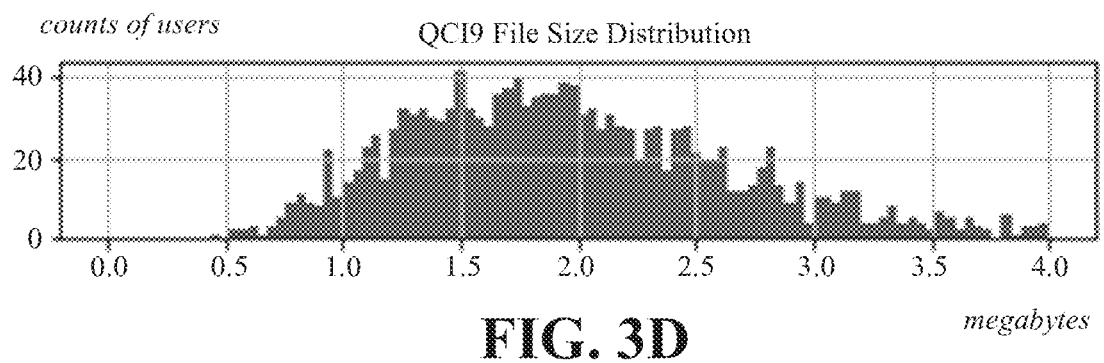

As represented in FIG. 2, in general more flexibility can be achieved by moving a QoS controller 202 to a cloud environment. This can be particularly beneficial when the performance of a larger area requests for a guarantee for, or needs to be guaranteed to, a given user/device class, e.g., when premium subscribers are guaranteed a certain level of performance.

Groups of NodeBs 204(1)-204(n) can have different QCI weight settings, with different sets of statistics collected by one or more collectors 206. Simulations can be performed by simulators 208(1)-208(m) for any group of NodeBs. The results of the different settings can be aggregated and evaluated at a central evaluator 210. The settings for a given group are selected based on the evaluator, and conveyed back by the QoS controller 202 to the NodeBs in that group. Note that this typically does not mean a single group of settings for the group of NodeBs, but rather, based on the aggregated results, a selected group of settings per NodeB; e.g., group D for NodeB 1, group A for NodeB 2, group D for NodeB 3, group C for NodeB 4 and so on.

In general, the QCI weight settings are flexible such that each individual NodeB or any group of NodeBs can have different settings that provide the desired results to a high likelihood. A QoS controller can be implemented for each NodeB or group of NodeBs to change the QCI weights as desired, e.g., set on demand rather than set statically.

To summarize in general, in either the architecture of FIG. 1 or FIG. 2, the QoS controller via a collector monitors the RF conditions of each data session per QCI, collects the statistics of the session volumes and other information, and passes the statistics to a simulator. The simulator runs multiple scenarios with different QCI weight settings to output simulated results. An evaluator takes the output results and evaluates which group of QCI weight settings is closest to "optimal" according to engineering criteria that specifies desired performance and/or service class level differentiation. The process can be repeated automatically from time to time such that it can change the weights as conditions change. The QoS controller can perform the priority adjustment for one NodeB, or for a group of NodeB's simultaneously. Adjustment for group of NodeBs is advantageous when the performance target is set for a group instead of for any individual NodeBs, especially when the traffic of individual NodeBs is small.

It should be noted that over time various historical patterns can emerge that give the QoS controller an opportunity to proactively change the weight settings. For example, it can be statistically recognized that heavy data traffic with approximately x QCI8 subscribers and approximately y QCI9 subscribers tends to occur from 4 pm to 6 pm on work days. Rather than first collect statistics, run simulations and evaluate the results to reactively select a group of QCI weight settings, at 4 pm on a work day a group of settings that ordinarily provides desired performance for the typical conditions can be proactively applied by the QoS controller for use by one or more NodeBs. At this point, reasonable performance is likely achieved for the time being, based on historical patterns. Notwithstanding, even if proactively set, the QoS controller can continue to gather updated statistics, run simulations on those updated statistics and evaluate the simulation results, to possibly further adjust the QCI weight settings for even more improved performance.

Turning to aspects of a collector (e.g., 206 FIG. 2), the collector 206 monitors the statistics reported from NodeBs, including, but not limited to, user reported RF conditions (e.g., the distribution of channel quality indicator values for LTE/5G networks), distribution of data session volumes, arrival rates of overall users, and ratio of different traffic classes. The various information can be continuously collected, such as within a predetermined time window, and passed to the simulator.

FIGS. 3A-3D are histograms showing example statistical distributions of data that a collector can collect over a period of time. In the examples of FIGS. 3A-3D, the vertical axes show the counts (number of users) for spectral efficiency (converted from channel quality indicator data) values in bits per second per Hertz, and for file size in megabytes, respectively for QCI8 (FIGS. 3A AND 3B) and QCI9 (FIGS. 3C AND 3D) classes in LTE networks. As can be seen in these particular example statistics, for QCI8 users the file transmit sizes tend to center around one megabyte, whereas for QCI9 users the file transmit sizes tend to be more widely distributed and generally larger. As is understood, these are only some possible examples, and other statistics can be collected that significantly vary.

Figure 5:
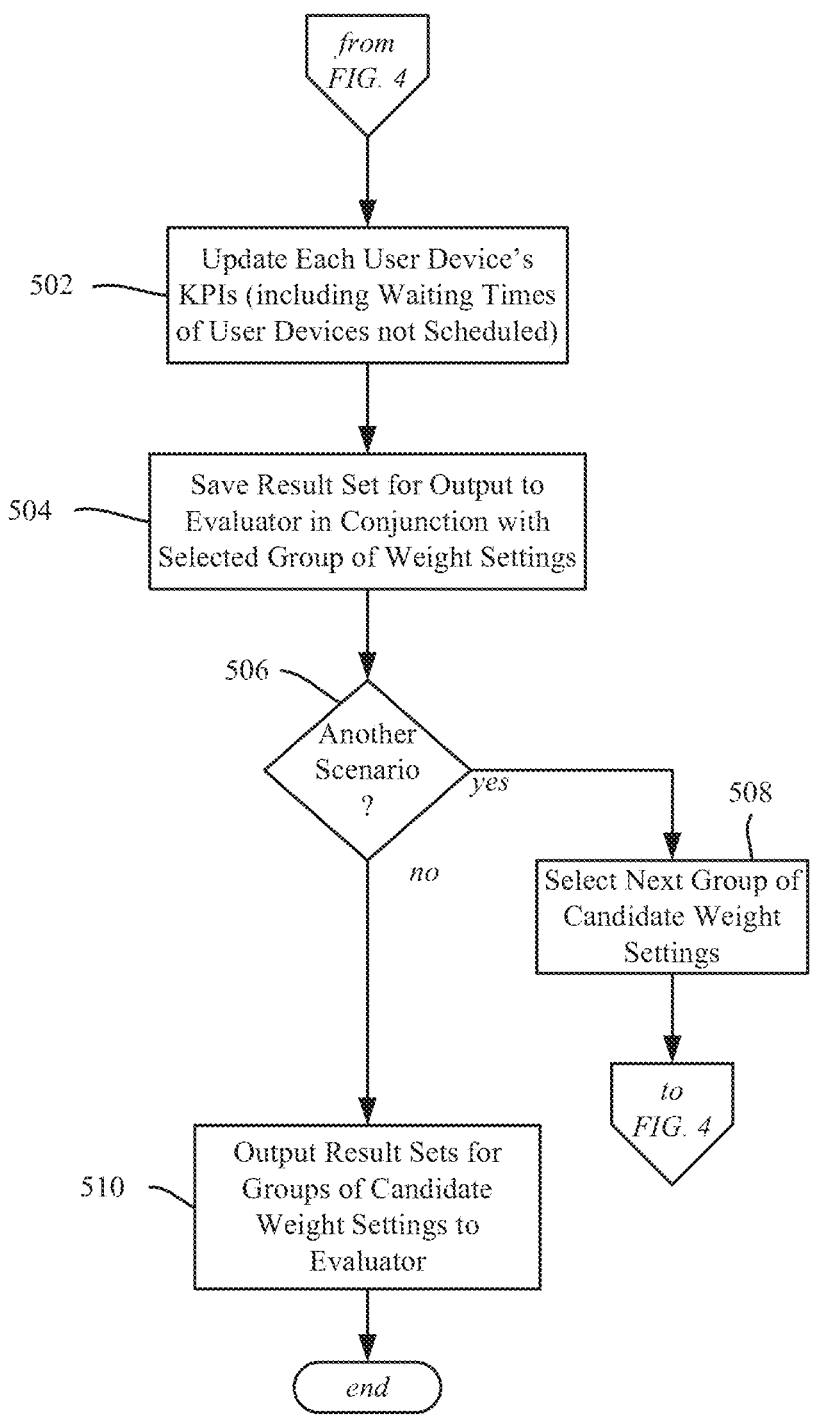

FIGS. 4 and 5 comprise a flow diagram representing how simulation works based on a set of collected statistics. As described above, it is feasible to use actual statistics if enough information is maintained in association them, e.g., for each user device, user device arrival times, departure times, channel quality/RF conditions, user device QCI class. However, given one set of collected actual statistics, some random variation can be used to simulate other real world scenarios based on the collected statistics.

The examples of FIGS. 4 and 5 are based on some random variation of actual statistics. Operation 402 of FIG. 4 represents the collector collecting a set of actual statistics for some period of time. As will be understood, in a given scenario over a period of time user devices arrive at different times, each with different possible parameters including channel quality, size of data transmission, and user device QCI class. Once arrived, a user device has resources allocated to them, before the device eventually departs.

Operation 404 initializes a queue, which will be where user devices are added and removed, to empty. Operation 406 evaluates whether this is the first scenario to be run.

The first time a scenario is run, random generation occurs. In general, the simulator via the random generator essentially creates new, random histograms. As represented in operation 408, user devices are randomly assigned arrival times, channel quality values, data transmission sizes, and user device QCI class values. As in the real world, user devices also depart at various times. For example, a first user device can be randomly chosen as a QCI8 user device, with an RF condition (channel quality indicator value) of ten, and a file size of one megabyte. Three seconds later a second user arrives, with a channel quality indicator value of five, and a file size of two megabytes, and so on for subsequent arrival (and departure) times.

Operation 410 represents selecting a first group of QCI candidate weight settings. As will be understood, the randomly generated data for user devices will be fixed for a scenario, with only the weight settings being varied over multiple scenarios. In this way, from among the candidate groups, the one group of QCI candidate weight settings that gives the desired results, as evaluated by an evaluator based on some engineering rules and/or criteria, to meet some performance objective(s), will be chosen for actual use.

Operation 414 represents a clock manager (e.g., a module or process routine/thread) determining when to add the next user device arrival to the queue. An arrival tracker (block 414) records the arrival times and other parameters that were assigned (initially randomly) to this user device. This recorded information will be fixed used for the next scenarios, that is, with different candidate groups of weight settings as described herein. Thus, the arrival tracker records, per user device, the time of arrival, user device QCI class, RF condition data and data transmission size.

Operation 416 represents allocating resources for user devices in the queue based on their parameters, as determined by the QCI weight settings for the current candidate group of settings being simulated. It should be noted that any suitable scheduler (e.g., provided by a vendor) can be chosen to schedule/allocate the resources, such as to choose a particular vendor's scheduler to determine QCI weight settings that give desired results for that particular vendor.

Operation 418 represents the clock manager removing or keeping user device in the queue, depending on the schedule determined (initially) randomly. The simulation process returns to operation 414 to queue new user devices as scheduled, and so on, until a stopping criterion is reached, as determined via operation 420. A period of time is one suitable criterion, in that it matches how statistics are typically collected. However another stopping criterion can be used, e.g., stop when some limit as to a total number of user devices has been queued/dequeued.

When the first run of a scenario is finished, the process branches to operation 502 of FIG. 5, which updates each user device's ley performance indicators (KPIs), including waiting times of user devices not scheduled. This result set is saved at operation 504 as output data in conjunction with the selected group of weight settings that was used in that first scenario. The record data can include each user device's KPIs, including how much time was spent waiting in the queue, to produce per user KPI, which can be aggregated per class and aggregated as a total.

Any practical number of scenarios, corresponding to different groups of candidate weight settings, may be run; operation 506 branches to operation 508 to select a next group of candidate weight settings to re-run using the same user device data as the other scenarios. Operation 508 returns to operation 404 to empty the user device queue.

This scenario run, however, branches to operation 412, where the arrival tracker provides the recorded (fixed) data for use as input by the clock manager at operation 414, and so on as described above. As is understood, the simulated data remains the same, with the only difference in each scenario being a new, different candidate group of weight settings being used to generate a new result set.

Eventually, there will be no more candidate groups of weight settings to evaluate, and operation 506 branches to operation 510, which outputs the result sets for the different groups of weight settings to the evaluator. It should be noted, however, that many of the operations can be performed in parallel. For example, once the device arrival times, other parameters and so on are randomly generated, the different groups of weight settings can be processed to generate the result sets in parallel, at least to some extent. Further, once a result set is generated, the evaluator can process that result set, for evaluation against the other result sets as they come into the evaluator.

In another aspect, consider that the multiple scenarios for one collection of randomly generated simulated data is a first simulation session; it is also feasible to run any number of such sessions with different collections of randomly generated simulated data. In this way, for example, the evaluator need not choose the desired weight settings from only one session, but can determine whether the desired weight settings determined from several sessions tend to converge upon a particular group. Such multiple sessions can thereby eliminate the possibility that some collection of randomly generated data was outlier data that appears to provide the best results, but in actuality has a low probability of matching actual conditions in which the finally chosen group of weight settings is to be applied.

Figure 6:
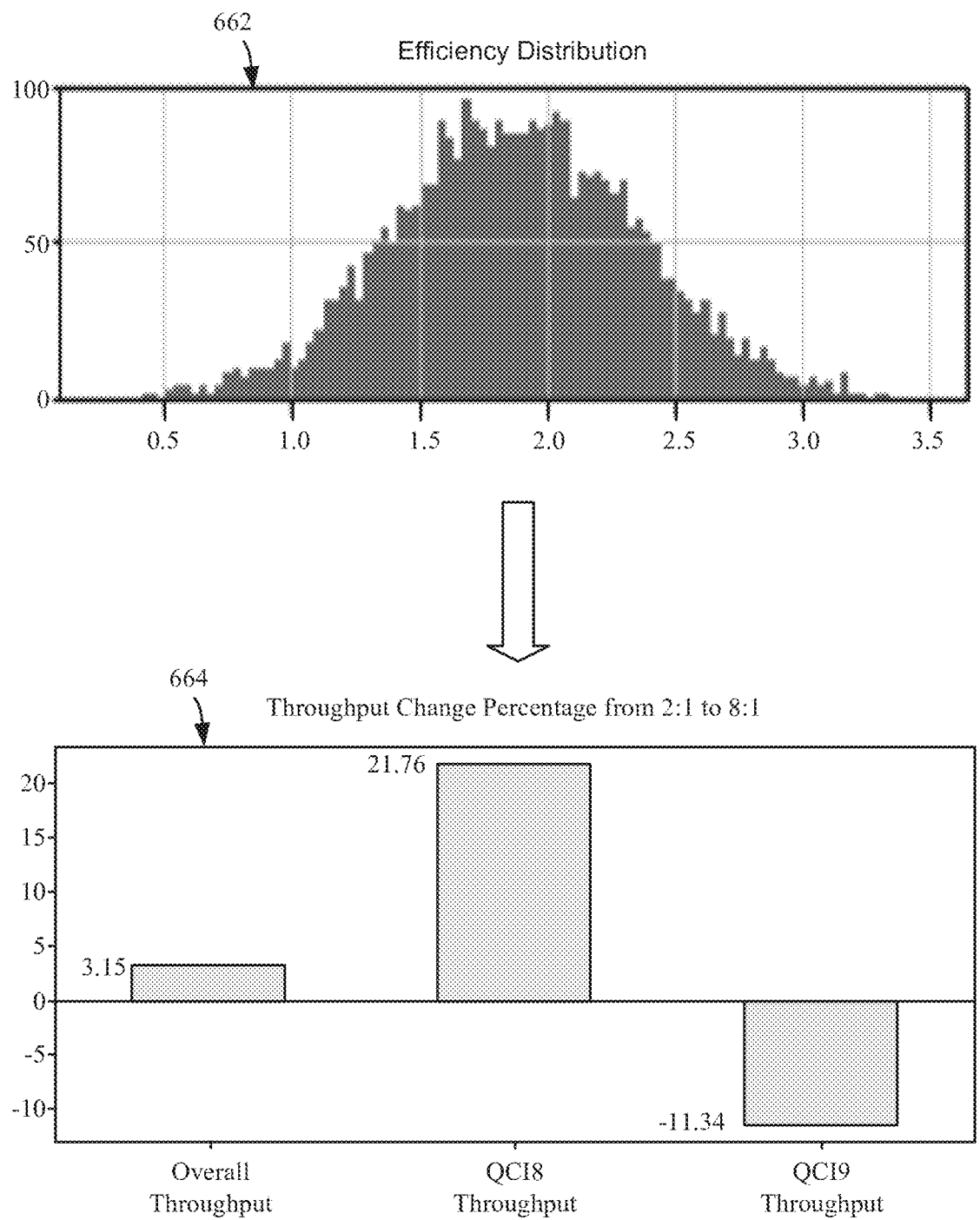
FIGS. 6 and 7 are representations of example simulation results for QCI8 and/QCI9 classes under different RF (radio frequency) conditions, in accordance with various aspects and embodiments of the subject disclosure.
Figure 7:
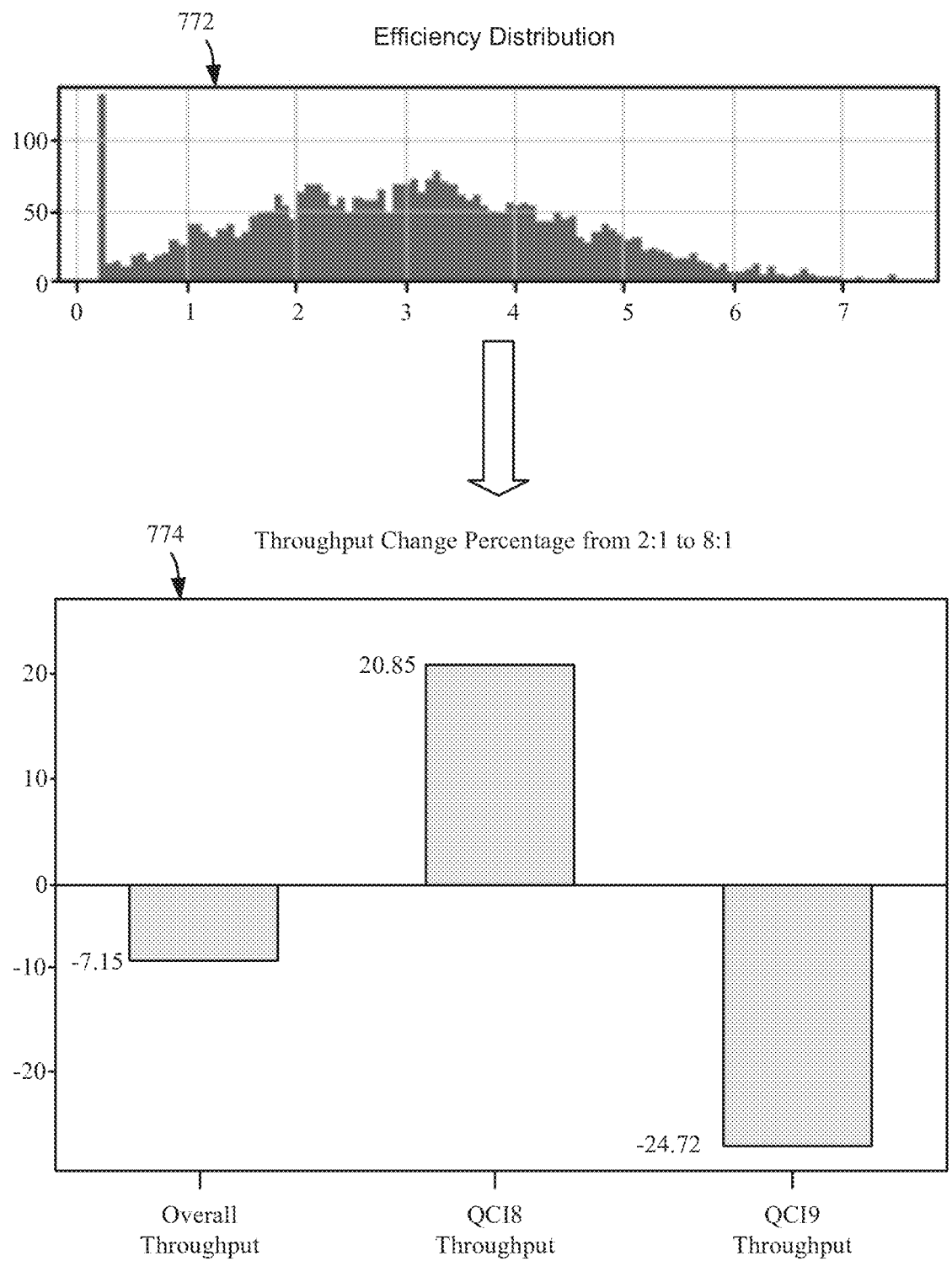

FIGS. 6 and 7 graphically show results of examples where two QCI classes (QCI8/QCI9) under different RF conditions are simulated, and in which the QCI weight ratios for QCI8 versus QCI9 are increased from 2:1 to 8:1. Indeed, the throughputs for the QCI classes and overall throughputs can vary depending on the spectral efficiency distributions and the QCI weight settings are changed.

As can be seen, in FIG. 6, with one set of efficiency distribution data (graph 662), changing to an 8:1 ratio provides (as seen in the graph 664) an overall throughput increase of 3.15 percent relative to a 2:1 ratio, with a 21.68 percent increase for CQI8 class user devices and a −11.34 percent decrease for CQI9 class user devices. In contrast, in FIG. 7, with a different set of efficiency distribution data (graph 772), changing to an 8:1 ratio provides (as seen in the graph 774) an overall throughput decrease of −7.15 percent relative to a 2:1 ratio, with a 20.85 percent increase for CQI8 class user devices and a −24.72 percent decrease for CQI9 class user devices. Thus, it is seen that the statistical data that is used as a basis for the simulations and evaluations plays a significant role, as does the group of weight settings in use. The results show that the QCI8/QCI9 throughput is improved or degraded as expected, but the overall throughput can be increased or decreased, depending on whether the variance of spectral efficiency (SE) is small or large. Such variations in the results can be determined by collected statistics and a simulator as described herein.

Figure 8:
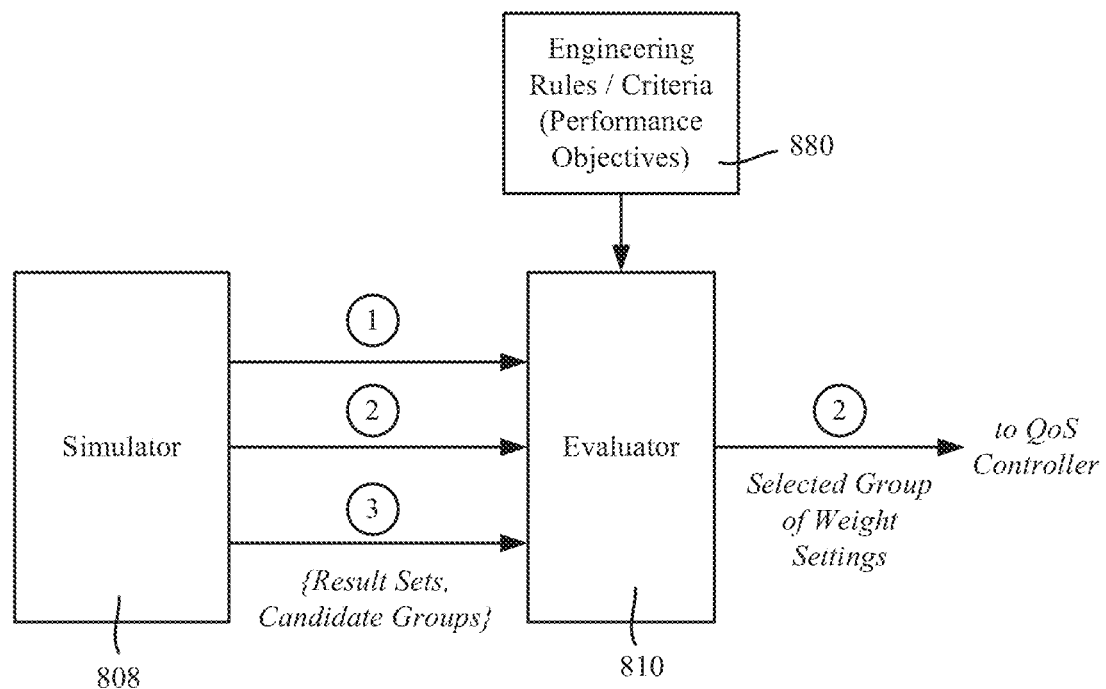
FIG. 8 is a representation showing an example evaluator choosing a group of QCI weight settings based on evaluation of simulated results against engineering criteria/rules, in accordance with various aspects and embodiments of the subject disclosure.

FIG. 8 represents the concept of an evaluator 810, which in this example takes three possible {result sets, candidate group weight settings} as provided by a simulator 808. In this example, based on engineering rules/criteria (that determine the performance objectives to be met), the second group of weight settings is chosen for sending to the QoS controller for applying to a NodeB.

To summarize, the evaluator evaluates the outcomes of multiple QCI candidate weight settings and corresponding results from the simulator, and chooses the most desirable one according to the engineering rules. For example, one criterion can be that the overall performance does not degrade, while the service differentiation is enlarged. To this end, the evaluator considers the multiple outcomes and focuses on those settings that did not cause an overall performance degradation. Among the ones that did not cause an overall performance degradation, the evaluator may use additional rules to select one group of settings, e.g., a group settings is chosen for use if it has the largest overall performance improvement while the performance of the individual classes is beyond some minimal threshold, and so on.

Any of various rules can be set for the evaluator. Examples on how the evaluator can select the optimal setting for both standalone and cloud-based architectures are provided herein.

More particularly, consider for a given site i, there are options j which can produce an overall throughput estimate of $thpt_{ij}$. Let $x_{ij}=1$ denote option that j is selected by site i, otherwise $x_{ij}=0$. If the overall throughput is the sum of each site's throughput, the problem can be described as solving the following optimization problem:

$$\max\left\{\sum_i \sum_j x_{ij} thpt_{ij}\right\}$$

$$\text{subject to } \sum_j x_{ij} = 1 \text{ for all } i, \text{ and } x_{ij} = \{0, 1\}.$$

If the overall throughput is the harmonic mean of all sites throughput, where the each site's throughput can be expressed as $thpt_{ij}=NUM_{ij}/DEN_{ij}$, (the numerator is the number of bits, which is divided by the denominator, the length of the transmission times), the problem can be described as solving the following optimization problem:

$$\max\left\{\frac{\sum_i \sum_j x_{ij} NUM_{ij}}{\sum_i \sum_j x_{ij} DEN_{ij}}\right\}$$

$$\text{subject to } \sum_j x_{ij} = 1 \text{ for all } i, \text{ and } x_{ij} = \{0, 1\}$$

Figure 9:
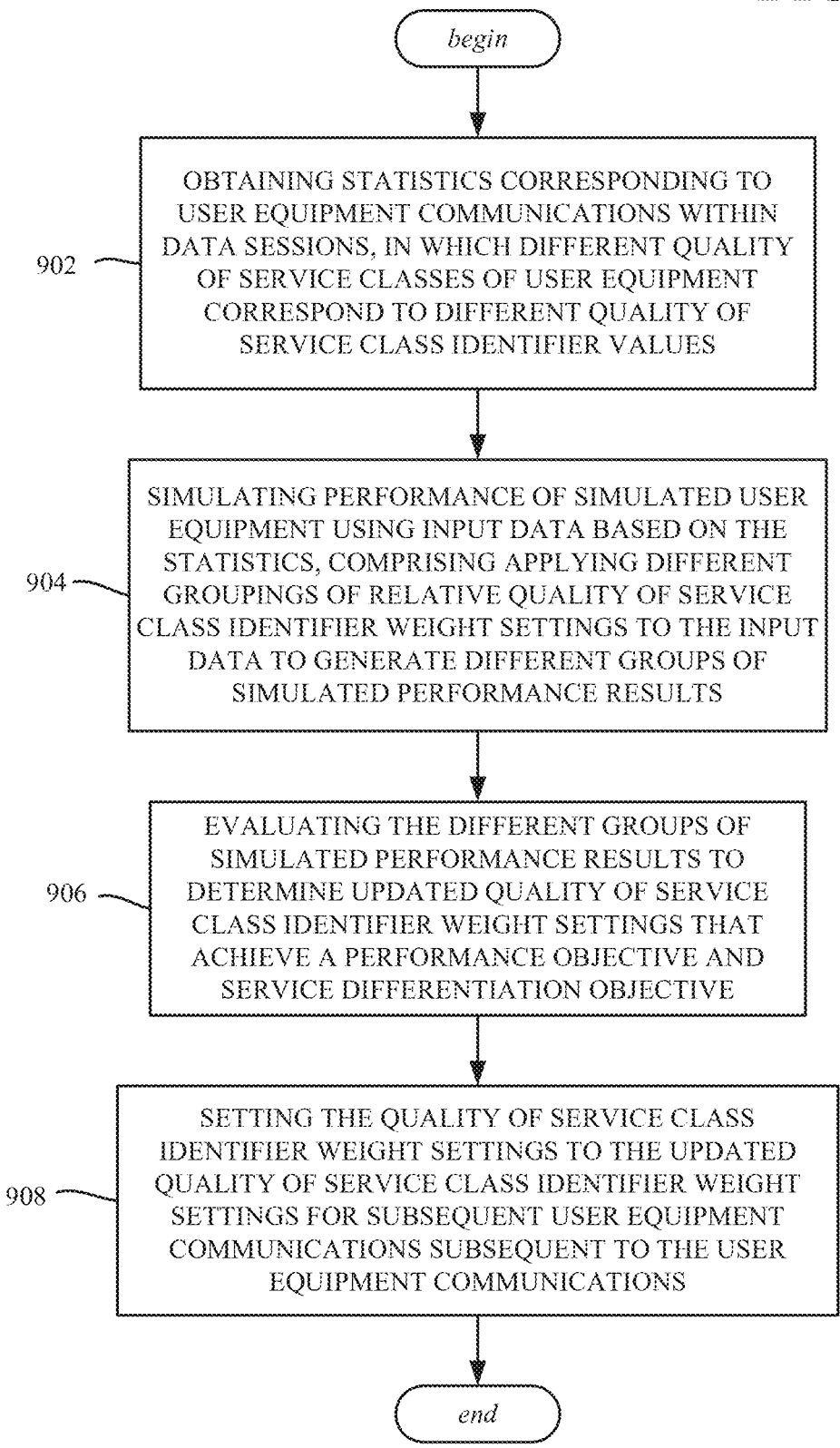
FIG. 9 illustrates example operations of a QoS controller to determine and set relative QoS weight settings, in accordance with various aspects and embodiments of the subject disclosure.

One or more example aspects are represented in FIG. 9, and can correspond to a system, comprising a processor, and a memory that stores executable instructions that, when executed by the processor of network equipment, facilitate performance of operations. Example operation 902 represents obtaining statistics corresponding to user equipment communications within data sessions, in which different quality of service classes of user equipment correspond to different quality of service class identifier values. Example operation 904 represents simulating performance of simulated user equipment using input data based on the statistics, comprising applying different groupings of relative quality of service class identifier weight settings to the input data to generate different groups of simulated performance results. Example operation 906 represents evaluating the different groups of simulated performance results to determine updated quality of service class identifier weight settings that achieve a performance objective and service differentiation objective. Example operation 908 represents setting the quality of service class identifier weight settings to the updated quality of service class identifier weight settings for subsequent user equipment communications subsequent to the user equipment communications.

Obtaining can include monitoring radio frequency conditions of the user equipment, and collecting session volume data of the user equipment. Obtaining can include monitoring radio frequency conditions per the different classes of the user equipment.

Setting the quality of service class identifier weight settings to the updated quality of service class identifier weight settings can be performed by a quality of service controller for a standalone cell site. Evaluating the different groups of simulated performance results to determine the updated quality of service class identifier weight settings can include selecting the updated quality of service class identifier weight settings to increase data throughput of the standalone cell site.

Setting the quality of service class identifier weight settings to the updated quality of service class identifier weight settings can be performed by the quality of service controller for the group of cell sites. Evaluating can include selecting the updated quality of service class identifier weight settings to increase an overall throughput of the group of cell sites at least a defined amount of throughput. The overall throughput of the group of cell sites can be based on a sum of the throughput of the group of cell sites. The overall throughput of the group of cell sites can be determined based on a harmonic mean of throughputs of the group of cell sites.

The statistics can correspond to at least one of: a radio frequency condition, a distribution of data session volumes, arrival rates of a total number of user equipment, or ratio data for different traffic classes of different traffic associated with different ones of the user equipment.

Figure 10:
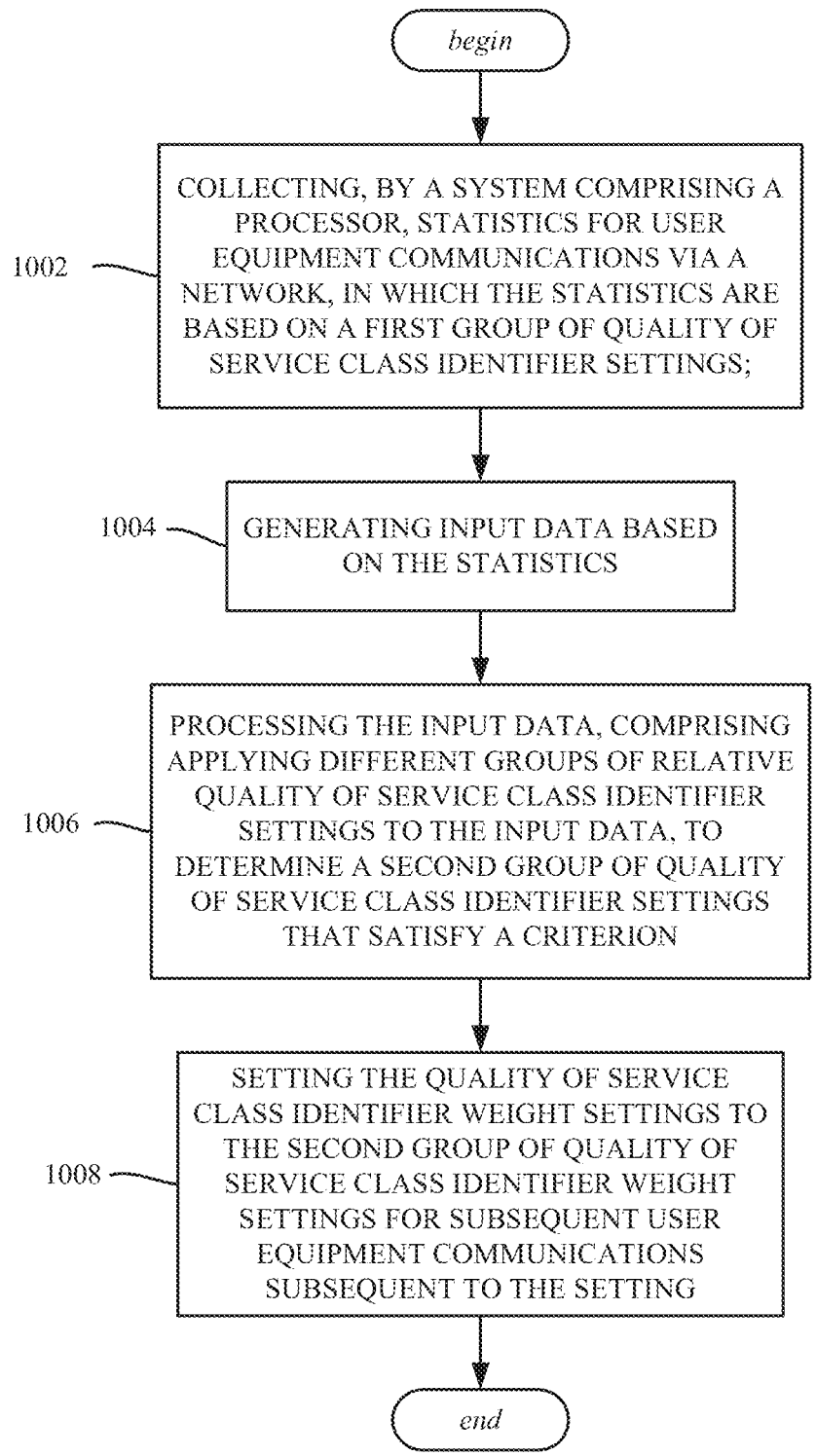
FIG. 10 illustrates example operations of QoS controller to generate input data for evaluation by an evaluator based on statistics, in order to determine and set relative QoS weight settings, in accordance with various aspects and embodiments of the subject disclosure.

One or more example aspects are represented in FIG. 10, and can correspond to operations of a method. Operation 1002 represents collecting, by a system comprising a processor, statistics for user equipment communications via a network, in which the statistics are based on a first group of quality of service class identifier settings. Operation 1004 represents generating input data based on the statistics. Operation 1006 represents processing the input data, comprising applying different groups of relative quality of service class identifier settings to the input data, to determine a second group of quality of service class identifier settings that satisfy a criterion. Operation 1008 represents setting the quality of service class identifier weight settings to the second group of quality of service class identifier weight settings for subsequent user equipment communications subsequent to the setting.

Applying can include obtaining different groups of simulated performance results corresponding to the different groups of relative quality of service class identifier settings, and evaluating the different groups of simulated performance results to select the second group of quality of service class identifier settings.

Processing further can include selecting the second group of quality of service class identifier settings for which an overall performance metric is not degraded after service differentiation is increased.

Processing further can include selecting the second group of quality of service class identifier settings that enable a largest overall throughput that also satisfies class performance thresholds for user equipment classes of the user equipment.

Setting the quality of service class identifier weight settings can include applying the second group of quality of service class identifier weight settings to a group of cell sites.

Figure 11:
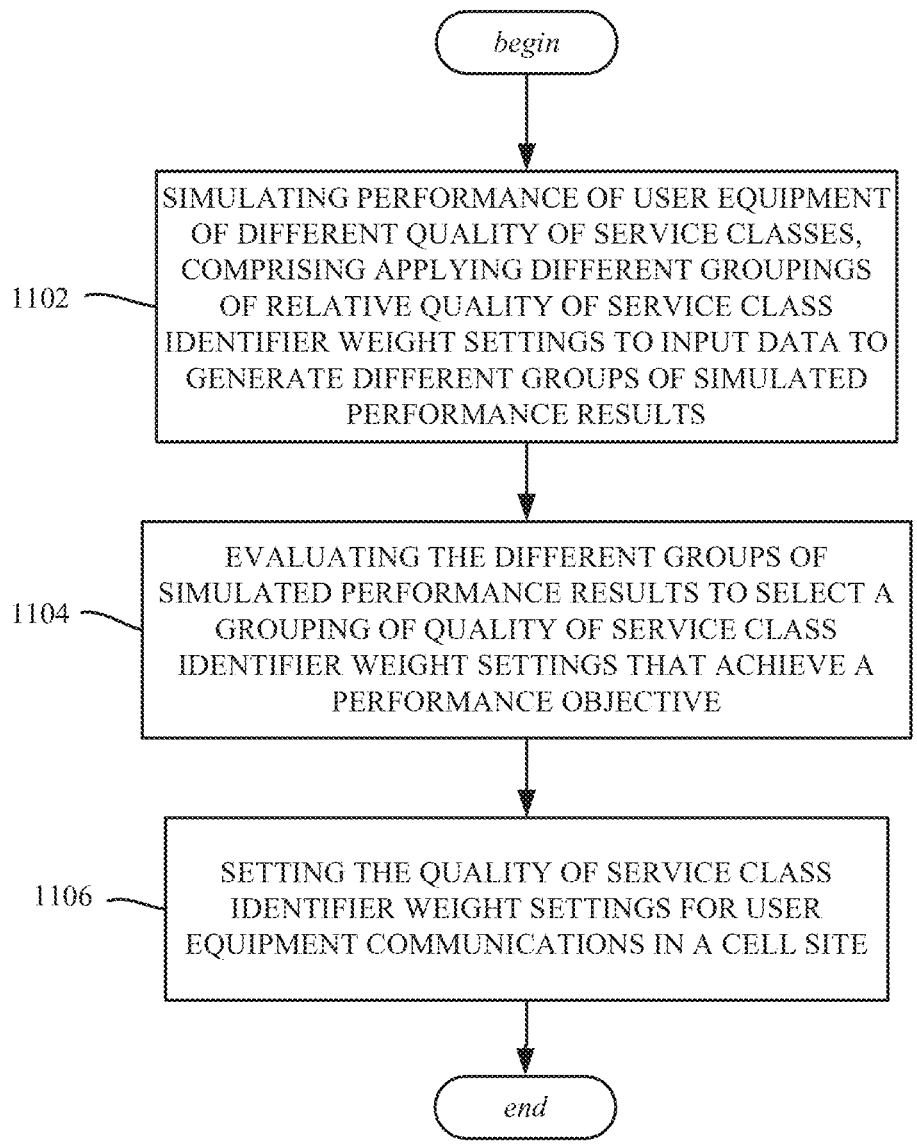
FIG. 11 illustrates example operations of using statistics to simulate performance results based on variable QoS weight settings, and selection of a group of QoS weight settings based on evaluating the performance results, in accordance with various aspects and embodiments of the subject disclosure

One or more aspects are represented in FIG. 11, such as implemented in a machine-readable storage medium, comprising executable instructions that, when executed by a processor of a network equipment, facilitate performance of operations. Example operation 1102 represents simulating performance of user equipment of different quality of service classes, comprising applying different groupings of relative quality of service class identifier weight settings to input data to generate different groups of simulated performance results. Example operation 1104 represents evaluating the different groups of simulated performance results to select a grouping of quality of service class identifier weight settings that achieve a performance objective. Example operation 1106 represents setting the quality of service class identifier weight settings for user equipment communications in a cell site.

Further operations can include collecting statistics for the user equipment communications in the cell site, and generating the input data based on the statistics.

The input data can be based on the statistics, and further operations can include modifying the statistics with randomly generated information. Modifying can include modifying at least one of: arrivals of the user equipment, radio frequency conditions of the user equipment, or data traffic sizes for the user equipment.

The user equipment communications in the cell site can be first user equipment communications in a first cell site, and further operations can include applying the quality of service class identifier weight settings to second user equipment communications in a second cell site.

As can be seen, the technology described herein provides a network structure and function (a QoS controller) to perform QoS control. In one implementation, a QoS controller automates the QCI priority setting in an intelligent manner. The QoS controller can be a standalone module for one or one group of NodeBs, or can be in a cloud for large-scale network control of multiple NodeBs.

In one implementation, a QoS controller includes a collector, a simulator, and an evaluator. The technology adjustments service differentiation automatically and on demand, instead of setting once in a static, manual process. The on demand changes can be made rapidly, are robust in improving the overall performance.

The technology can be applied to any wireless/wired networks that use concepts similar to the QCI weighting for service differentiation, and therefore is not limited to LTE or 5G. The technology overcomes the deficiencies of traditional static QCI weighting by providing automated and intelligent solutions that provide improved performance.

By providing improved service differentiation, more premium users are expected to want to pay for improved service. Further, because the technology operates to improve overall network performances, other commercial advantages can be realized, e.g., proper service differentiation slows demand, or a need, for capacity expansion. The technology can be integrated as a service of a Self-Organizing Network (SON), to further conserve resources.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000, etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 12:
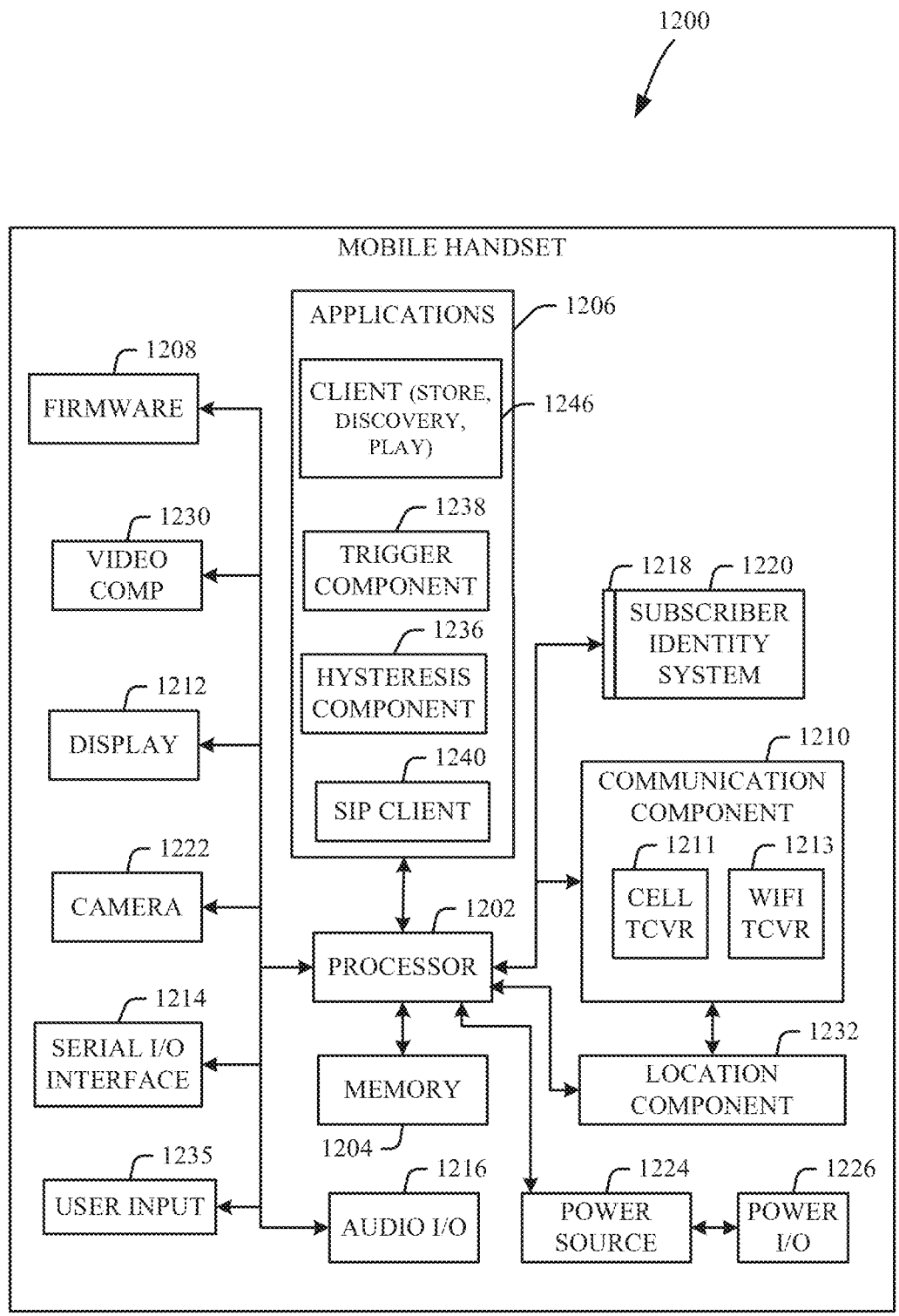
FIG. 12 illustrates an example block diagram of an example mobile handset operable to engage in a system architecture that facilitates wireless communications according to one or more embodiments described herein.

Referring now to FIG. 12, illustrated is a schematic block diagram of an example end-user device such as a user equipment) that can be a mobile device 1200 capable of connecting to a network in accordance with some embodiments described herein. Although a mobile handset 1200 is illustrated herein, it will be understood that other devices can be a mobile device, and that the mobile handset 1200 is merely illustrated to provide context for the embodiments of the various embodiments described herein. The following discussion is intended to provide a brief, general description of an example of a suitable environment 1200 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1200 includes a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208, and executed by the processor 1202 from either or both the memory 1204 or/and the firmware 1208. The firmware 1208 can also store startup code for execution in initializing the handset 1200. A communications component 1210 interfaces to the processor 1202 to facilitate wired/wireless communication with external systems, e.g., cellular networks, VoIP networks, and so on. Here, the communications component 1210 can also include a suitable cellular transceiver 1211 (e.g., a GSM transceiver) and/or an unlicensed transceiver 1213 (e.g., Wi-Fi, WiMax) for corresponding signal communications. The handset 1200 can be a device such as a cellular telephone, a PDA with mobile communications capabilities, and messaging-centric devices. The communications component 1210 also facilitates communications reception from terrestrial radio networks (e.g., broadcast), digital satellite radio networks, and Internet-based radio services networks.

The handset 1200 includes a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE 1294) through a hardwire connection, and other serial input devices (e.g., a keyboard, keypad, and mouse). This supports updating and troubleshooting the handset 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The handset 1200 can include a slot interface 1218 for accommodating a SIC (Subscriber Identity Component) in the form factor of a card Subscriber Identity Module (SIM) or universal SIM 1220, and interfacing the SIM card 1220 with the processor 1202. However, it is to be appreciated that the SIM card 1220 can be manufactured into the handset 1200, and updated by downloading data and software.

The handset 1200 can process IP data traffic through the communication component 1210 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1222 (e.g., a camera) can be provided for decoding encoded multimedia content. The video processing component 1222 can aid in facilitating the generation, editing and sharing of video quotes. The handset 1200 also includes a power source 1224 in the form of batteries and/or an AC power subsystem, which power source 1224 can interface to an external power system or charging equipment (not shown) by a power I/O component 1226.

The handset 1200 can also include a video component 1230 for processing video content received and, for recording and transmitting video content. For example, the video component 1230 can facilitate the generation, editing and sharing of video quotes. A location tracking component 1232 facilitates geographically locating the handset 1200. As described hereinabove, this can occur when the user initiates the feedback signal automatically or manually. A user input component 1234 facilitates the user initiating the quality feedback signal. The user input component 1234 can also facilitate the generation, editing and sharing of video quotes. The user input component 1234 can include such conventional input device technologies such as a keypad, keyboard, mouse, stylus pen, and/or touch screen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1238 when the Wi-Fi transceiver 1213 detects the beacon of the access point. A SIP client 1240 enables the handset 1200 to support SIP protocols and register the subscriber with the SIP registrar server. The applications 1206 can also include a client 1242 that provides at least the capability of discovery, play and store of multimedia content, for example, music.

The handset 1200, as indicated above related to the communications component 810, includes an indoor network radio transceiver 1213 (e.g., Wi-Fi transceiver). This function supports the indoor radio link, such as IEEE 802.11, for the dual-mode GSM handset 1200. The handset 1200 can accommodate at least satellite radio services through a handset that can combine wireless voice and digital radio chipsets into a single handheld device.

Figure 13:
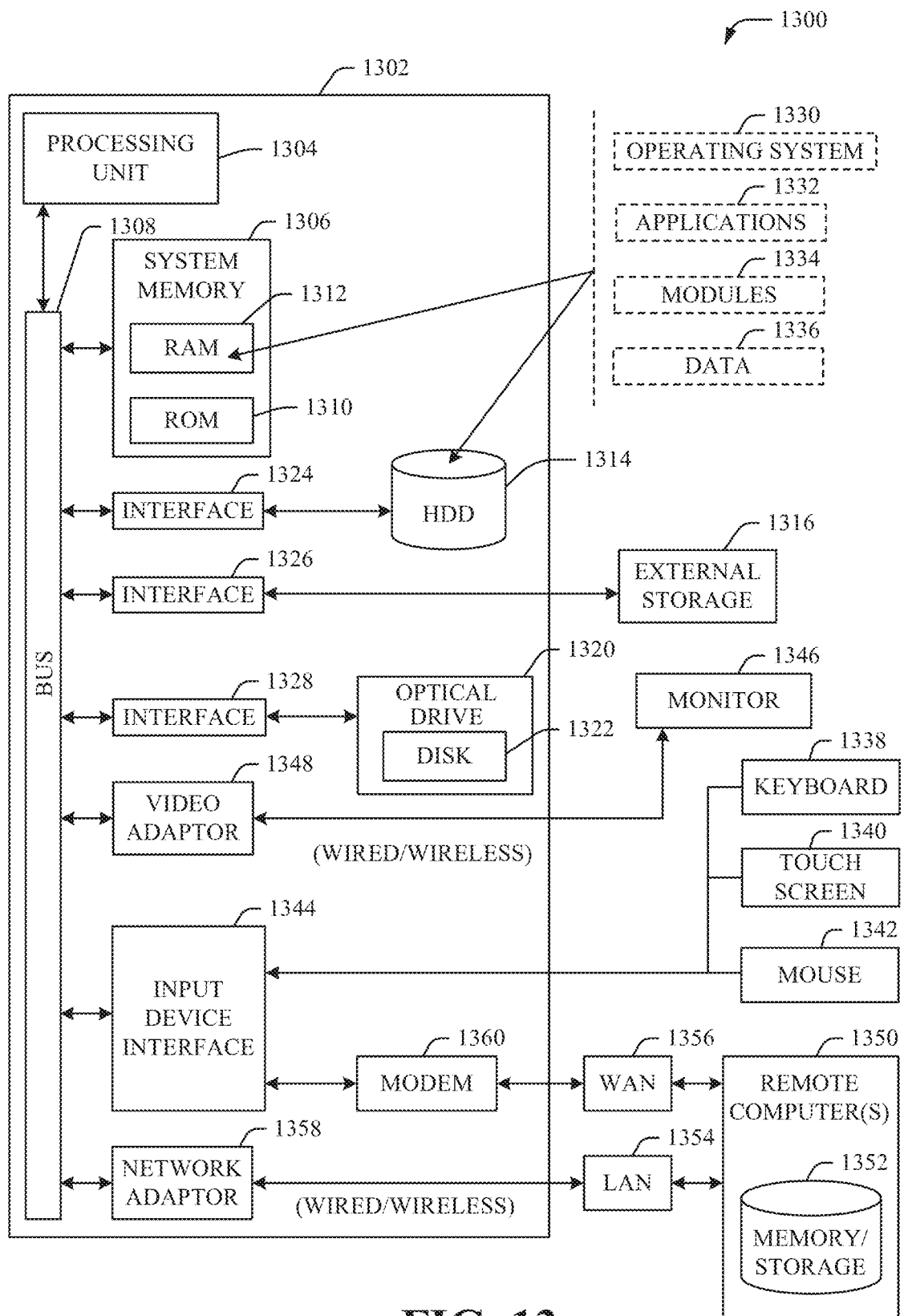
FIG. 13 illustrates an example block diagram of an example computer/machine system operable to engage in a system architecture that facilitates wireless communications according to one or more embodiments described herein.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD), non-volatile memory and other storage technology could be used in addition to, or in place of, an HDD 1314, and can be internal or external. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1294 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally include emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can include one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1294 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 13 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
    a processor; and
    a memory that stores executable instructions which, when executed by the processor of network equipment, facilitate performance of operations, the operations comprising:
        obtaining statistics corresponding to user equipment communications within data sessions, in which different quality of service classes of user equipment correspond to different quality of service class identifier values;
        simulating performance of simulated user equipment using input data based on the statistics, comprising applying different groupings of relative quality of service class identifier weight settings to the input data to generate different groups of simulated performance results;
        evaluating the different groups of simulated performance results to determine updated quality of service class identifier weight settings that achieve a performance objective and a service differentiation objective; and
        setting the quality of service class identifier weight settings to the updated quality of service class identifier weight settings for subsequent user equipment communications subsequent to the user equipment communications.

2. The system of claim 1, wherein the obtaining comprises monitoring radio frequency conditions of the user equipment, and collecting session volume data of the user equipment.

3. The system of claim 1, wherein the obtaining comprises monitoring radio frequency conditions per the different classes of the user equipment.

4. The system of claim 1, wherein setting the quality of service class identifier weight settings to the updated quality of service class identifier weight settings is performed by a quality of service controller for a standalone cell site.

5. The system of claim 4, wherein evaluating the different groups of simulated performance results to determine the updated quality of service class identifier weight settings comprises selecting the updated quality of service class identifier weight settings to increase data throughput of the standalone cell site.

6. The system of claim 1, wherein setting the quality of service class identifier weight settings to the updated quality of service class identifier weight settings is performed by the quality of service controller for the group of cell sites.

7. The system of claim 6, wherein the evaluating comprises selecting the updated quality of service class identifier weight settings to increase an overall throughput of the group of cell sites at least a defined amount of throughput.

8. The system of claim 7, wherein the overall throughput of the group of cell sites is based on a sum of the throughput of the group of cell sites.

9. The system of claim 7, wherein the overall throughput of the group of cell sites is determined based on a harmonic mean of throughputs of the group of cell sites.

10. The system of claim 1, wherein the statistics correspond to at least one of: a radio frequency condition, a distribution of data session volumes, arrival rates of a total number of user equipment, or ratio data for different traffic classes of different traffic associated with different ones of the user equipment.

11. A method, comprising:
    collecting, by a system comprising a processor, statistics for user equipment communications within data sessions, in which different quality of service classes of user equipment correspond to different quality of service class identifier values;
    simulating, by the system, performance of simulated user equipment using input data based on the statistics, comprising applying different groupings of relative quality of service class identifier weight settings to the input data to generate different groups of simulated performance results;
    evaluating, by the system, the different groups of simulated performance results to determine updated quality of service class identifier weight settings that achieve a performance objective and a service differentiation objective; and
    setting, by the system, the quality of service class identifier weight settings to the updated quality of service class identifier weight settings for subsequent user equipment communications subsequent to the user equipment communications.

12. The method of claim 11, wherein the collecting comprises monitoring radio frequency conditions of the user equipment, and collecting session volume data of the user equipment.

13. The method of claim 11, wherein the collecting comprises monitoring radio frequency conditions per the different classes of the user equipment.

14. The method of claim 11, wherein setting the quality of service class identifier weight settings to the updated quality of service class identifier weight settings is performed by a quality of service controller for a standalone cell site.

15. The method of claim 14, wherein evaluating the different groups of simulated performance results to determine the updated quality of service class identifier weight settings comprises selecting the updated quality of service class identifier weight settings to increase data throughput of the standalone cell site.

16. A non-transitory machine-readable medium, comprising executable instructions that, when executed by a processor of network equipment, facilitate performance of operations, the operations comprising:
    obtaining statistics corresponding to user equipment communications within data sessions, in which different quality of service classes of user equipment correspond to different quality of service class identifier values;
    simulating performance of user equipment input data based on the statistics, comprising applying different groupings of relative quality of service class identifier weight settings to the input data to generate different groups of simulated performance results;
    evaluating the different groups of simulated performance results to determine updated quality of service class identifier weight settings that achieve a performance objective and a service differentiation objective; and
    setting the quality of service class identifier weight settings to the updated quality of service class identifier weight settings for subsequent user equipment communications subsequent to the user equipment communications.

17. The non-transitory machine-readable medium of claim 16, wherein the obtaining comprises monitoring radio frequency conditions of the user equipment, and collecting session volume data of the user equipment.

18. The non-transitory machine-readable medium of claim 16, wherein the obtaining comprises monitoring radio frequency conditions per the different classes of the user equipment.

19. The non-transitory machine-readable medium of claim 16, wherein setting the quality of service class identifier weight settings to the updated quality of service class identifier weight settings is performed by a quality of service controller for a standalone cell site.

20. The non-transitory machine-readable medium of claim 19, wherein evaluating the different groups of simulated performance results to determine the updated quality of service class identifier weight settings comprises selecting the updated quality of service class identifier weight settings to increase data throughput of the standalone cell site.

* * * * *